US006796892B2

United States Patent
Allen et al.

(10) Patent No.: US 6,796,892 B2
(45) Date of Patent: Sep. 28, 2004

(54) METHOD AND APPARATUS FOR PROCESSING CARCASSES

(75) Inventors: Deloran M. Allen, Derby, KS (US); James R. Rathke, Ft. Morgan, CO (US)

(73) Assignee: Excel Corporation, Whicita, KS (US)

( * ) Notice: Subject to any disclaimer, the term of this patent is extended or adjusted under 35 U.S.C. 154(b) by 0 days.

(21) Appl. No.: 10/000,794

(22) Filed: Nov. 1, 2001

(65) Prior Publication Data

US 2002/0077055 A1 Jun. 20, 2002

Related U.S. Application Data

(60) Provisional application No. 60/245,956, filed on Nov. 3, 2000.

(51) Int. Cl.[7] ........................... A22C 21/06; A22C 21/00
(52) U.S. Cl. ....................... 452/106; 452/173; 452/177; 452/182
(58) Field of Search ............................. 452/53, 57, 63, 452/67, 52, 71, 74, 75, 77, 106, 107, 182, 173, 177, 179, 180, 181, 183, 184

(56) References Cited

U.S. PATENT DOCUMENTS

| | | | |
|---|---|---|---|
| 3,643,293 A | | 2/1972 | Rejsa et al. |
| 3,729,773 A | * | 5/1973 | Dillon ........................ 426/524 |
| 3,774,264 A | * | 11/1973 | Anderson et al. ........... 452/135 |
| 4,187,945 A | | 2/1980 | Altenpohl et al. .......... 209/592 |
| 4,232,424 A | | 11/1980 | Denefe ........................... 17/24 |
| 4,667,370 A | * | 5/1987 | Brockington et al. |
| 4,813,101 A | | 3/1989 | Brakels et al. ................. 17/11 |
| 4,862,557 A | * | 9/1989 | Clayton et al. |
| 4,972,549 A | | 11/1990 | Van Den Nieuwelaar et al. .......................... 472/178 |
| 5,037,351 A | | 8/1991 | Van Den Nieuwelaar et al. .......................... 452/179 |
| 5,246,396 A | * | 9/1993 | Schumann et al. ........... 452/52 |
| 5,344,360 A | * | 9/1994 | Hazenbroek ................. 452/182 |
| 5,453,045 A | * | 9/1995 | Hobbel et al. ............... 452/182 |
| 5,569,071 A | * | 10/1996 | Metier et al. ................ 452/185 |
| 5,672,098 A | * | 9/1997 | Veraart ........................ 452/182 |
| 5,944,598 A | | 8/1999 | Tong et al. .................. 452/158 |
| 5,980,375 A | | 11/1999 | Anderson et al. ............. 452/77 |
| 5,980,377 A | | 11/1999 | Zwanikken et al. ......... 452/184 |
| 5,993,308 A | * | 11/1999 | Martin et al. ................ 452/177 |
| 6,017,269 A | | 1/2000 | Altenpohl, III ............. 452/188 |
| 6,033,299 A | * | 3/2000 | Stone et al. ................. 452/182 |
| 6,165,062 A | * | 12/2000 | Martin et al. ............... 452/116 |

FOREIGN PATENT DOCUMENTS

EP              225306        *   6/1987

* cited by examiner

Primary Examiner—Peter M. Poon
Assistant Examiner—David Parsley
(74) Attorney, Agent, or Firm—Dorsey & Whitney LLP

(57) ABSTRACT

A method for processing meat along a meat processing line. The method includes removing viscera from a carcass, accumulating the carcass along a dead rail stack of the meat processing line, washing the carcass, and inspecting the carcass at an inspection station following the act of washing the carcass.

18 Claims, 7 Drawing Sheets

US 6,796,892 B2

METHOD AND APPARATUS FOR PROCESSING CARCASSES

CROSS-REFERENCE TO RELATED APPLICATION(S)

This application claims priority from provisional Application No. 60/245,956, filed Nov. 3, 2000, which is hereby incorporated by reference in its entirety

BACKGROUND OF THE INVENTION

This invention relates generally to food processing, including meat processing. More particularly, the invention relates to methods and devices that improve the dressing and processing of carcasses along meat processing lines.

During commercial meat production in a slaughterhouse, a carcass is subjected to a number of different procedures. An animal is first stunned and bled, its hide is removed from the resulting carcass, and the carcass is washed. The carcass may be steam pasteurized, and the carcass may also be subjected to an electrical stimulation process. Throughout this specification, the term "carcass" will be used to refer to the animal body after the animal is stunned and bled. The animal carcass is typically split into two equal halves at some point along the processing line depending on its species and the intended purpose for the carcass.

During commercial meat production, the carcass is attached to a trolley, gambrel, or shackle (hereinafter referred to as a "trolley") at an early point along the meat processing line. A trolley may be used in a variety of embodiments. In general, the trolley includes a hook or other suitable connection device to attach the carcass to the trolley, and a roller, slide device, or wheel of the trolley travels along a rail. The trolley is typically moved along the rail either by the force of gravity or by the use of a power chain above the rail that engages the trolley and pulls it along the rail. The carcass, which is attached to and hangs from the trolley, may therefore be moved along the meat processing line and a number of processing functions may be performed at various stations along the processing line.

A meat processing line contains one or more processing line segments and one or more segments of power chains. In other words, a first power chain may pull a trolley and attached carcass through a first series of processing stations, the first power chain may then be disengaged from the trolley, and a second power chain may engage the trolley and pull the trolley through a second series of processing stations. Any number of such processing line segments and power chain segments may be used. For each segment of the power chain along the processing line, however, a stoppage of the power chain or slowing of the rate of movement of the power chain will impact the entire segment of the processing line along that power chain, thus affecting the processing rate of the carcasses. In typical meat processing lines, each power chain segment moves at the same rate.

A carcass in a slaughterhouse travels along the meat processing line and is subjected to a number of processes, including those identified above as well as weighing of the carcass and removal of some portions of the carcass. The carcasses are also inspected at a number of locations along the meat processing line, and certain information regarding carcasses is typically recorded at the inspection locations. In addition, portions of the carcass that have been removed, such as the viscera, may be inspected to ensure that the animal was healthy at the time of slaughter.

FIG. 1 is a flowchart showing the processes typically performed on a carcass moving along a meat processing line, during commercial beef production. As shown in FIG. 1, the following processes are typically performed. The animal is stunned and bled (block 10). Next, the hide is removed (block 12). The carcass is subjected to a prewashing operation (block 14). Viscera is removed and the carcass is split into two halves (block 16). The carcass is inspected (block 18). The carcass is weighed on a scale (block 20) and washed (block 22).

FIG. 1 depicts these processes of a meat processing line, as well as the chilling of the carcass (block 24) after these procedures are complete. After the carcass wash (block 22), the carcass is typically delivered to a storage chill room where the carcass is cooled prior to further processing and packaging of the meat for distribution and consumption. Of course, numerous other processes, such as trimming and removal of certain portions of the carcass, are also typically carried out before chilling of the carcass.

Although a carcass may be inspected by numerous individuals or pieces of equipment along a meat processing line for various purposes, the terms "inspection" and "inspecting," as used throughout this specification, refer to a carcass inspection performed by either technical service personnel of the company or a government entity, such as the United States Department of Agriculture ("USDA"). Pursuant to statutory regulations or rules, an inspection of every carcass is typically performed at inspection stations located adjacent to or along the meat processing line. Usually, the inspection is performed by a person or a group of persons, and therefore human inspection creates a barrier to further mechanization and automation of a meat processing line. An inspector along a meat processing line typically looks for any bruising or contamination of a carcass, such as signs of any foreign material on the carcass, and for pathological problems, which may typically be discovered on beef carcasses through an examination of the vital organs (e.g., kidney, liver, and heart) or the lymph glands of the carcass. The transfer of bacteria from the skins of animals to meat is one problem in processing animal carcasses, and this problem has been dealt with through inspection and washing of the carcasses, including hot washes, steam pasteurization, and acid sprays.

The methods for processing and inspecting carcasses discussed above have disadvantages. First, final inspection is performed prior to the points in the meat processing line where carcasses are washed, weighed on a scale, trimmed, and steam pasteurized. As these processes involve handling of the carcasses, they may increase microbial contamination of the carcass. Thus, inspection of the carcasses prior to these processes results in a deficient inspection process. Second, because inspection is performed before weighing with a scale, portions of the carcass that are removed due to contamination, pathological problems, and/or bruising are not weighed, and as a result, no information on weight loss due to these problems can be gathered. The removal of such portions of the carcass before weighing also reduces the weight of the carcass and may therefore decrease the payment to the producer of the animal carcass, which is typically based, at least in part, on the weight of the carcass, with heavier carcasses garnering higher payments.

Additionally, inspection of the carcasses, as typically performed, may significantly slow the processing of carcasses along a meat processing line. If an inspection reveals a contaminated carcass or a carcass with some other defect, the entire processing line is shut down or slowed down in order to remove the carcass from the processing line or remove the contaminated portion from the carcass. Alternatively, at least the segment of the processing line immediately before the inspection station is shut down so that the carcass with the defect may be removed from the line. If a carcass with a defect or contamination is found, the carcass is removed from the main processing line, and it may be either recirculated after the defect has been cleared, or it may be condemned and disposed of if the defect is of a serious nature.

In meat processing lines known in the art, if the meat processing line or a segment thereof is slowed or shut off to remove a carcass at an inspection station, the entire meat processing line is affected, thus slowing the throughput of the meat processing line causing the line to operate for a longer period of time to process the same number of carcasses. Since microbial growth is dependent upon time and temperature, this time delay in processing carcasses and moving the carcasses to a chill room creates a situation in which all carcasses present on the line are subject to increased microbial growth. This potential for increased microbial growth, for which temperature conditions are optimal while a carcass is on the meat processing line, could create additional food safety concerns that may be minimized with a more consistent throughput of carcasses. It is desirable to process the carcasses and move the carcasses to the chill room as soon as possible after slaughter to decrease the chances of increased microbial growth.

There is a need in the art for methods and devices for improving the processing of carcasses in slaughterhouses that are commercially practical, relatively simple to implement, and improve the processing rate of carcasses and the effectiveness of the carcass inspection.

BRIEF SUMMARY OF THE INVENTION

One embodiment of the invention is a method for processing meat wherein a carcass moves along a meat processing line. In this embodiment, the method includes removing viscera from the carcass, accumulating the carcass along the meat processing line, washing the carcass, and inspecting the carcass at an inspection station following the act of washing the carcass.

Another embodiment of the invention is a method for processing a carcass. In this embodiment, the method includes attaching the carcass to a trolley and propelling the trolley along a rail of a meat processing line through the use of a power chain, wherein the power chain comprises a first power chain segment and a second power chain segment. Viscera is removed from the carcass. It is accumulated along the meat processing line, wherein a dead rail stack, for performing the accumulating, is formed generally between the first power chain segment and the second power chain segment. The carcass is then washed and inspected following the act of accumulating the carcass.

Another embodiment of the invention is a meat processing line. In this embodiment, the meat processing line includes a rail running through the meat processing line upon which a trolley carrying a carcass may travel, a gutter station for gutting and removing viscera from a carcass, an accumulation area following the gutter station for accumulating the carcass along the meat processing line, a washing station following the accumulation area, and an inspection station following the washing station.

Another embodiment of the present invention is a method for processing a multitude of carcasses along a meat processing line. The method includes attaching the carcasses to trolleys and propelling the trolleys along a rail. A selected carcass is identified and diverted to a second rail for further processing. The remaining carcasses are transferred to a third rail for inspection. The selected carcass is returned to the third rail for inspection, after the further processing is complete.

Still other embodiments of the present invention will become apparent to those skilled in the art from the following detailed description. As will be apparent, the invention is capable of modification in various obvious aspects, all without departing from the spirit and scope of the present invention. Accordingly, the drawings and detailed description are to be regarded as illustrative in nature and not restrictive.

DETAILED DESCRIPTION

A. General Overview

Figure 1:
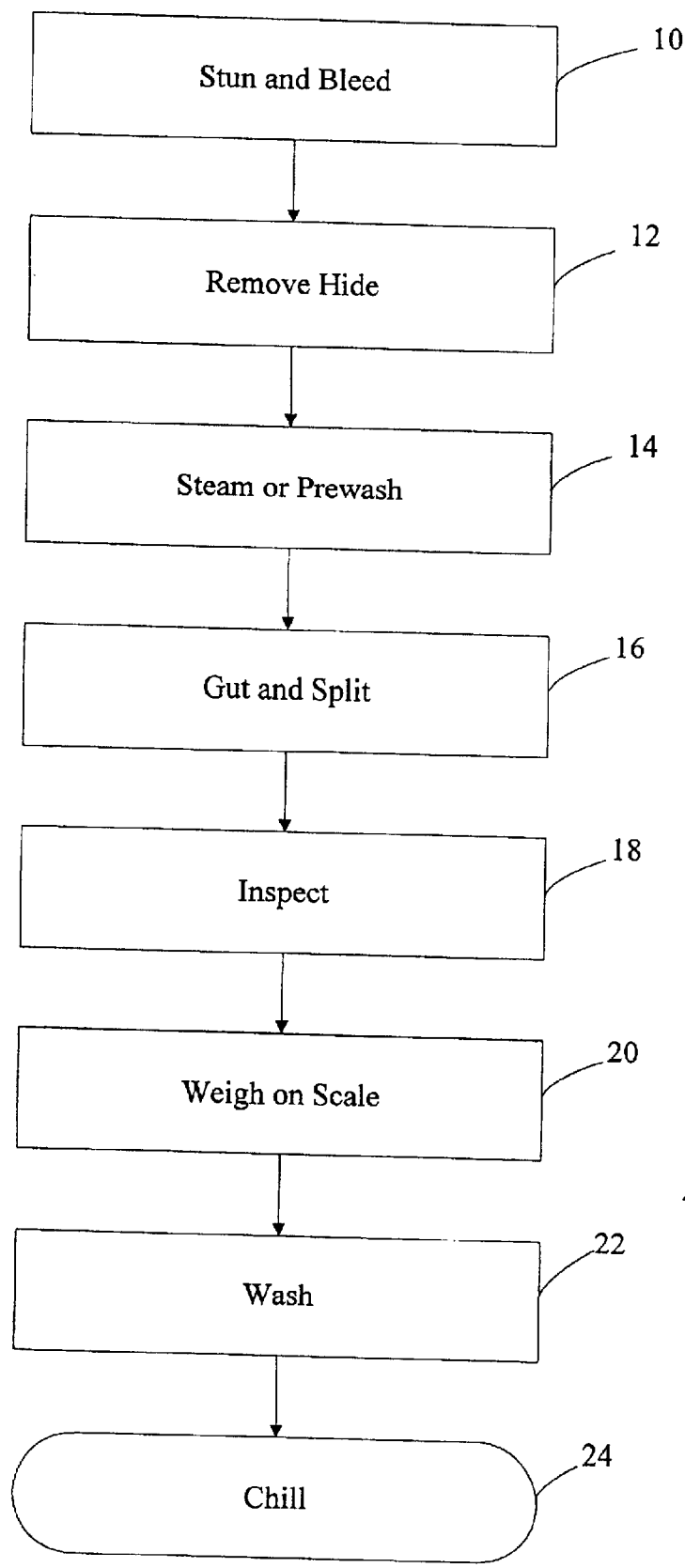
FIG. 1 is a flow chart of the order of processes along a typical meat processing line.
Figure 2:
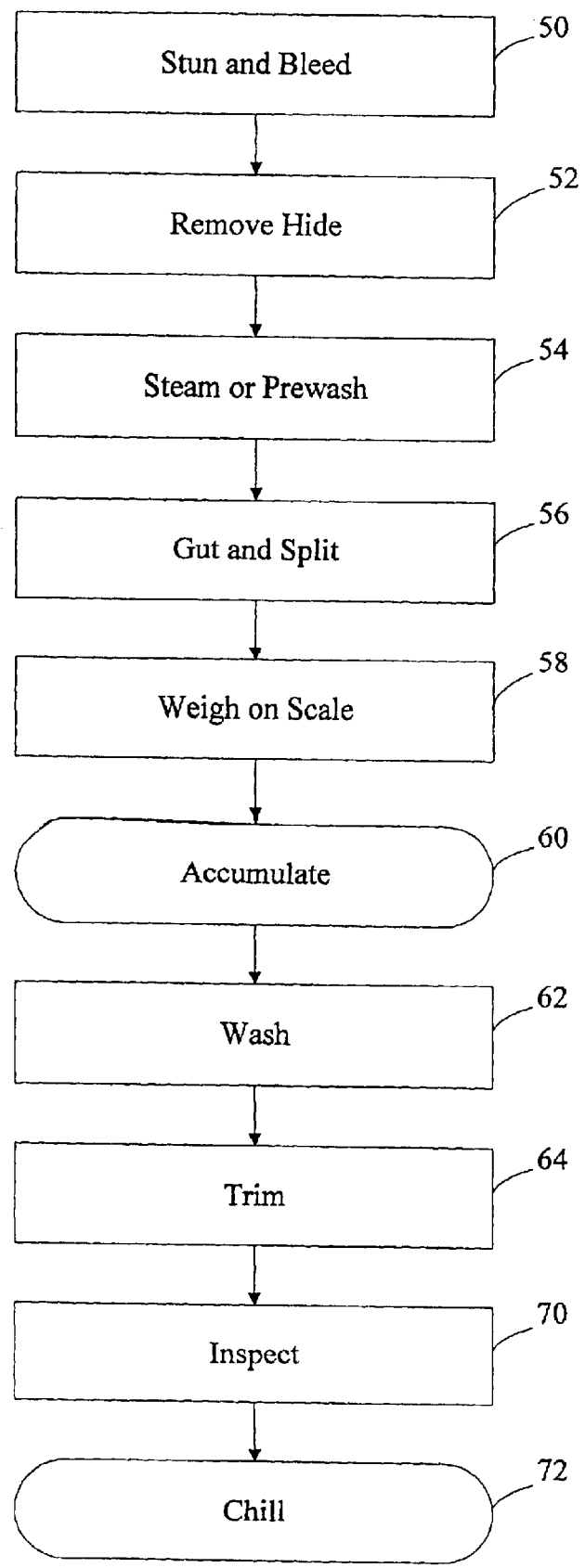
FIG. 2 is a flow chart of the processes of one embodiment of the invention.

One embodiment of the present invention is a method for processing food, particularly meat. In this embodiment, which is depicted in the flow chart of FIG. 2 and the floor plan of FIG. 6, the invention includes stunning and bleeding the animal (block 50), removing the hide (block 52), steaming or prewashing the carcass (block 54), removing viscera from splitting the carcass (block 56), weighing the carcass (block 58), accumulating the carcass (block 60) at or along the meat processing line, and inspecting the carcass (block 70) at an inspection station following the act of accumulating the carcass. FIG. 2 depicts these acts, and these acts are explained more fully below. Other procedures are, of course, also carried out on a carcass along the meat processing line, and many of these procedures are shown in FIG. 2.

Typically, meat processing lines are composed of segments of power chains, and the slowing or stopping of one segment of power chain impacts the other are segments of power chains. In one embodiment of the invention, however, carcasses are accumulated between segments of power chains that are isolated from one another. In other words, an accumulation area is positioned between two segments of power chains. By accumulating carcasses (block 60 in FIG. 2) before an inspection station, the meat processing line may operate more efficiently because a segment of the power chain leading up to the inspection station may be stopped and/or slowed down without impacting another segment of the power chain that is located before the accumulation area. If the segment of the power chain adjacent the inspection station is stopped or slowed, therefore, the segment of the line before the accumulating area may continue to run, and the carcasses may aggregate in the accumulation area.

Depending on the accumulation method used, the carcasses in the accumulation area may come into contact with each other. In this case, the carcasses may be thoroughly washed after the accumulation area and before the inspection station, thus providing washed carcasses at and after the inspection station.

B. The Trolley and Accumulation Area

Figure 3:
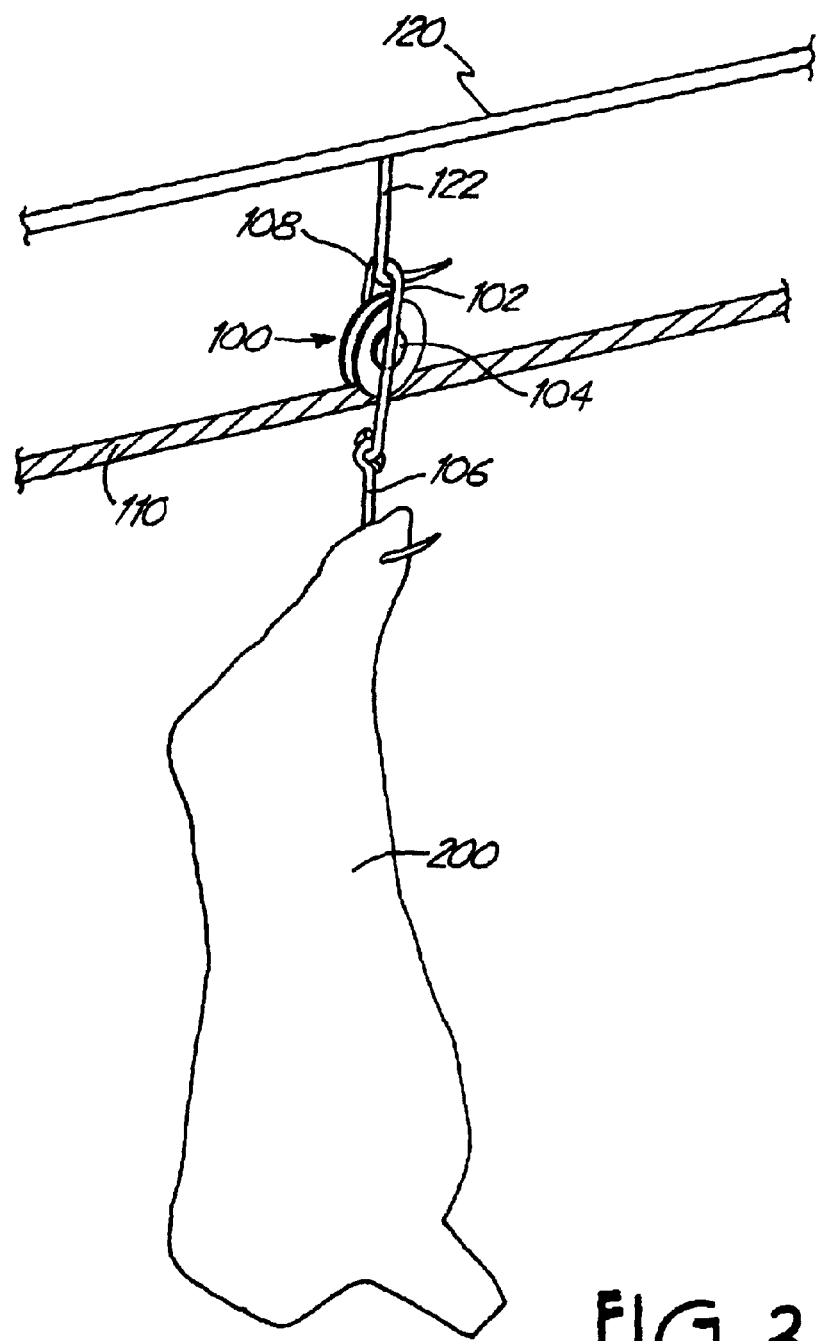
FIG. 3 is a side view of a carcass attached to a trolley that is moving along the rail of a meat processing line.

FIG. 3 depicts a typical trolley 100 moving along a rail 110 of the meat processing line with a carcass 200 attached to the trolley 100. The trolley 100 moves along the meat processing line with the carcass 200 hanging from the trolley 100 so that meat processing procedures may be performed on the carcass 200. The trolley 100 generally contains a trolley frame 102, a trolley wheel or roller 104, and a trolley hook 106. Any type of trolley 100, however, may be used within the scope of the invention. The rail 110 receives and supports the trolley wheel 104 such that the trolley 100 may be propelled along the rail 110. The trolley 100 also typically contains a link 108 which may be used to link the trolley 100 to an attaching device 122 of a power chain 120 for propelling the trolley 100 along the rail 110. The trolleys 100, rails 110, and power chains 120 used within the scope of the invention may be of any type known to those skilled in the art, and those depicted in FIG. 3 are exemplary embodiments that could be used within the scope of the invention.

Figure 4:
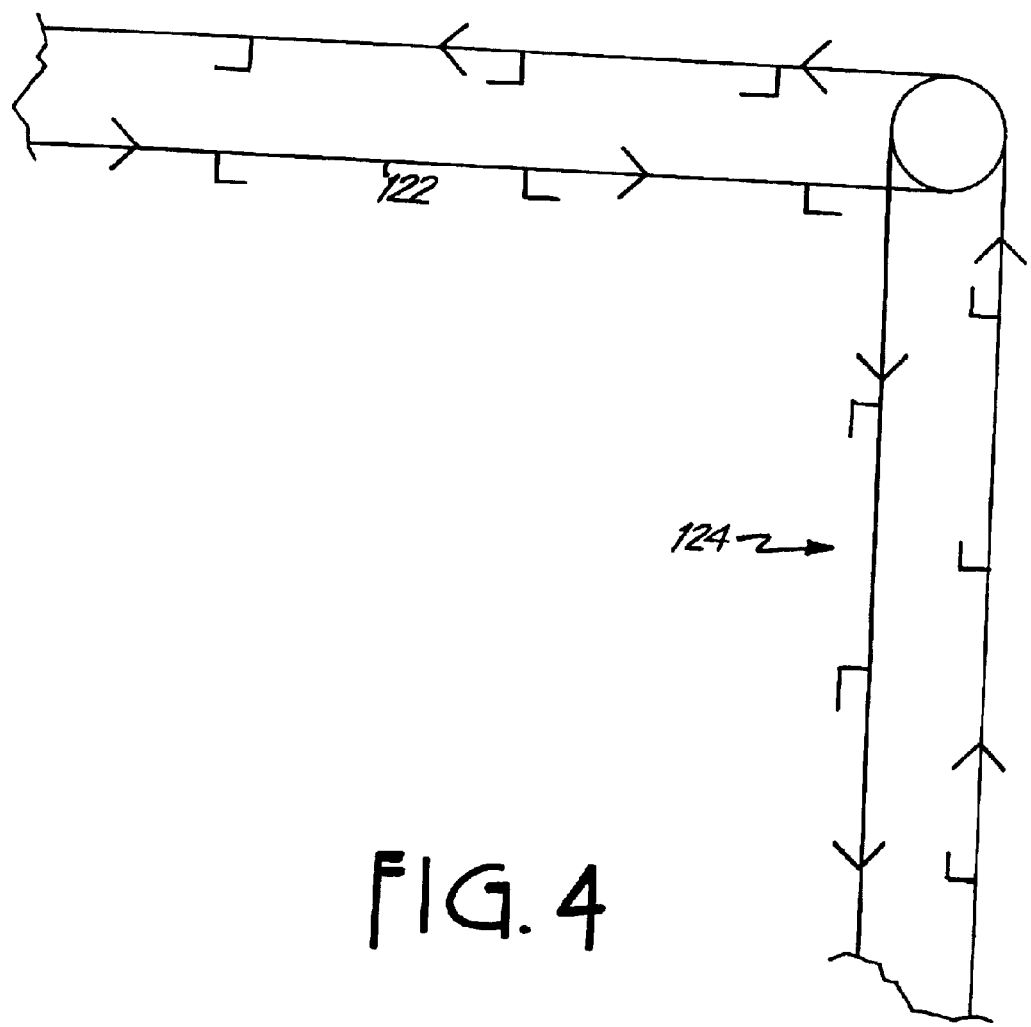
FIG. 4 is a top view of two power chain segments of a meat processing line.

As discussed above, a meat processing line may include several segments of power chains 120. FIG. 4 depicts two segments 122, 124 of power chains 120. A trolley 100 moving along a processing line may move from one segment 122 of a power chain 120 immediately to another segment 124 of a power chain 120. In other words, a first power chain along a first segment 122 of the processing line may disengage the trolley 100 and a second power chain 124 along a second segment 124 of the processing line may engage the trolley 100 and pull the trolley 100 along the line. Additionally and/or alternatively, a trolley 100 may be disengaged from a power chain 120 along certain portions of the meat processing line. A segment of the meat processing line or the rail 110 upon which a trolley 100 travels in which the power chain 120 is engaged with the trolley 100 may be referred to as a "live rail." A segment or rail adjacent a live rail in which the trolley 100 is not engaged by a power chain 120 may be referred to as a "dead rail."

The term "stack" will be used throughout this specification to refer to an accumulation area for carcasses 200 along the meat processing line in which a live chain is not engaged with a trolley 100, but instead a trolley 100 moves along the line by the force of gravity, by carcass-to-carcass contact, or by other methods aside from the power chain 120. The dead rail, in other words, forms a stack along the meat processing line. A "stack," therefore, may be a segment along a meat processing line in which a group of carcasses 200 may congregate while certain processes are performed on the carcasses 200, or a segment interposed between live rail segments of the meat processing line. An indexer 156 located at the end of the stack may form a stop for the carcasses 200 so that the carcasses 200 accumulate, and the indexer 156 may also be selectively operable to move the trolleys 100 and carcasses 200 to the next live rail segment of the meat processing line.

Figure 5:
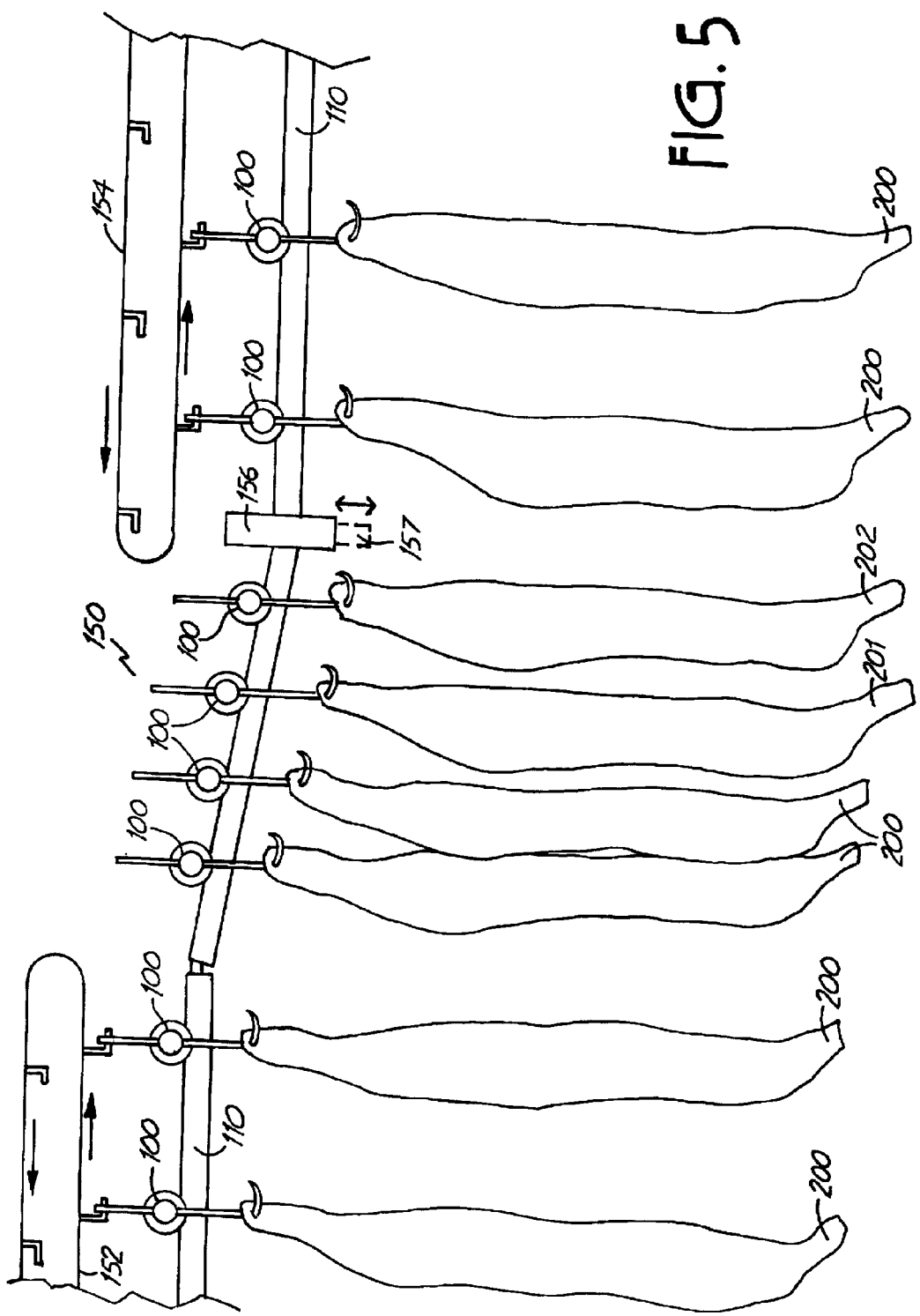
FIG. 5 is a side view of a stack along a dead rail section of a meat processing line.

FIG. 5 depicts a stack 150 in the meat processing line, which may be placed before the inspection station in an embodiment of the invention. In general, as explained above, the stack 150 is a portion of the rail that is not live, and the portion of the rail along the stack 150 is a dead rail. As shown in FIG. 5, a carcass 200 enters the stack area 150 on a trolley 100 that is powered by a power chain 152 of the meat processing line. In the stack area 150 of the line, however, the trolley 100 is not attached to the power chain 152. Instead, in the embodiment shown in FIG. 5, the portion of the rail 110 in the area of the stack 150 has a slight downward slope, such that the carcasses 200, 201, 202 move along the rail 110 under the force of gravity. In some embodiments, as shown in FIG. 5, a first carcass 201 contacts a second carcass 202, thus propelling the second carcass 202 forward. In some embodiments of the invention, a stack area 150 is used that does not contain a downward sloping portion of rail 110. Instead, carcass-to-carcass contact or other forces move the carcasses 200, 201, 202 forward in the stack area 150. In another embodiment of the invention, a parallel group of stacks 150 is formed along the meat processing lines. Such a parallel group of stacks 150 allows a larger number of carcasses 200 to congregate than if a single stack 150 is used.

In the depiction of FIG. 5, the stack 150 contains four carcasses 200, 200, 201, 202, although in other embodiments the stack 150 could be significantly larger, containing space for a large number of carcasses 200 if the downstream segment of the line is shut off. In the embodiment of FIG. 5, an indexer 156 may be located at the end, or bottom portion, of the stack 150. The indexer 156 may be any type of device that places a trolley 100 of a carcass (carcass 202 in FIG. 5) adjacent the indexer 156 into alignment with the next segment of the power chain 154, thus pulling the trolley 100 and carcass 202 along the meat processing line.

In one embodiment, two separate segments of power chains 152, 154 may not be used along with the indexer 150. Instead, a single power chain that runs over the stack 150 may be used, and the power chain may be simply disengaged with the trolley 100 of a carcass 200 when the carcass 200 enters the stack 150 area of the rail 110. In an embodiment containing a single power chain 25 over the stack 150, however, shutting down the power chain on either side of the stack 150 will shut down the entire power chain. The indexer 156 may function to align a trolley 100 with an adjacent power chain 154 or adjacent section of a power chain 154 through any method known to those skilled in the art. In the embodiment of FIG. 5, the indexer 156 contains a portion 157 that moves downward, grasps a trolley 100, and hoists the trolley 100 along with the attached carcass 200 up and onto the next segment of the rail 110, where the power chain 154 may link to the trolley 100 and pull the trolley 100 along the line. Although a specific type of stack 150 and indexer 156 have been described above and with 5 reference to FIG. 5, it should be noted that any type of stack 150 may be used within the scope of the invention to accumulate carcasses 200 if the downstream segment of the line is slowed or shut off.

Figure 6:
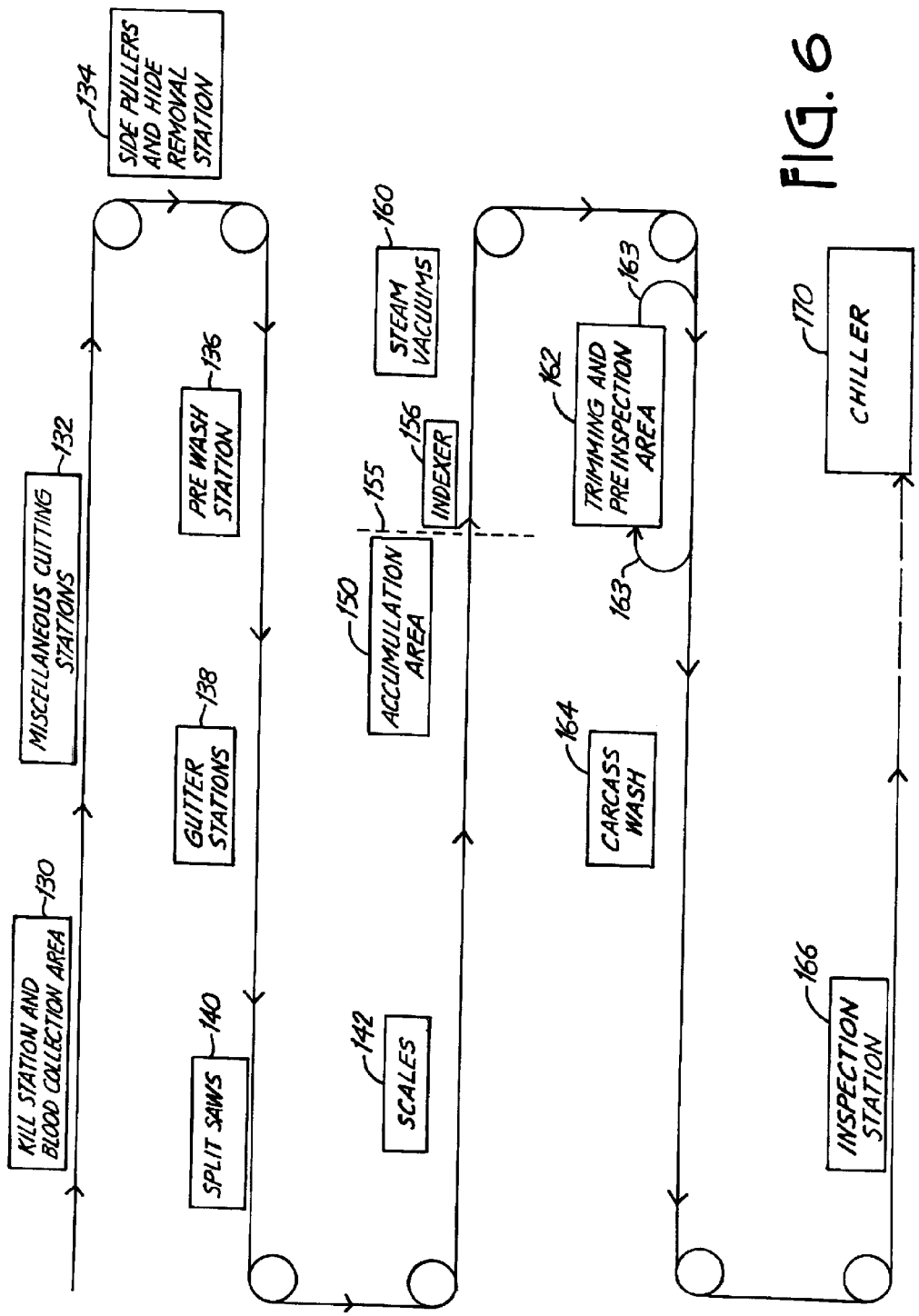
FIG. 6 is a drawing of a floor plan for a meat processing line according to one embodiment of the present invention.
Figure 7:
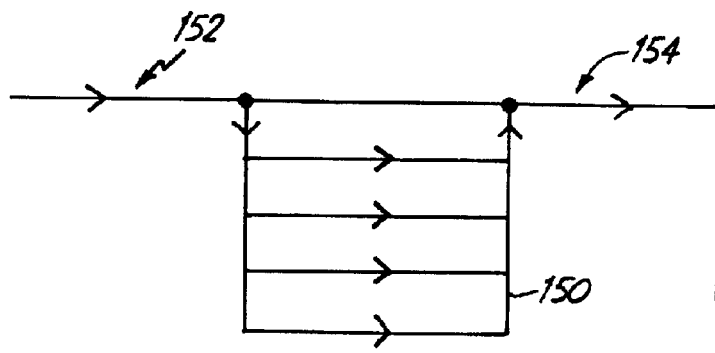
FIG. 7 is a top view of one embodiment of a rail-out area for use as an accumulation area.
Figure 8:
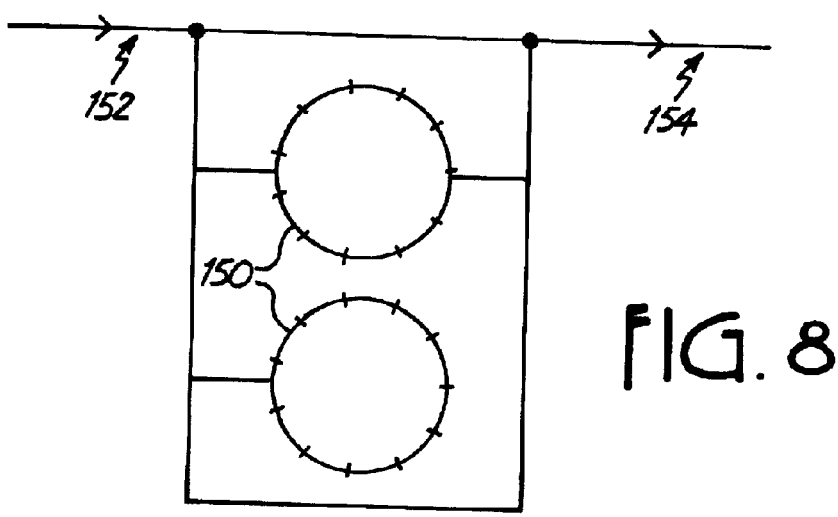
FIG. 8 is a top view of a second embodiment of a rail-out area for use as an accumulation area.
Figure 9:
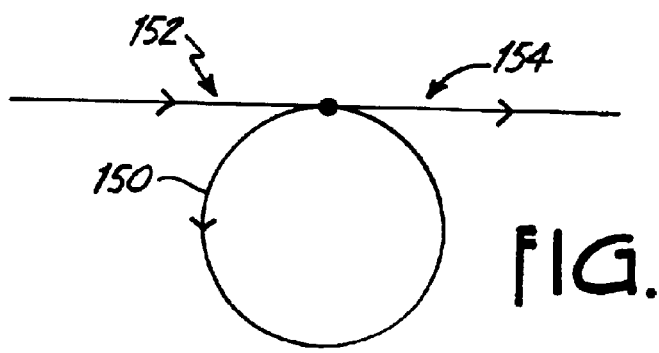
FIG. 9 is a top view of a separate power chain segment that may be used as an accumulation area

Instead of using a stack 150 as explained above, some other type of accumulation area may be placed before the inspection station 166 within the scope of the invention. FIGS. 7–9 depict alternative accumulation areas for use with the invention. For instance, a rail-out line could be used so that carcasses 200 could be railed off a moving section of the line before the inspection station 166 at a time when the segment of the power chain adjacent the inspection station 166 (shown in FIG. 6) has been slowed or stopped. In one embodiment, this is accomplished using a rail-out switch, as known to those of skill in the art.

FIGS. 7 and 8 depict possible rail-out areas for use as an accumulation area 150. When the segment 154 of the power chain adjacent the inspection station 166 has been restarted, the carcasses 200 in the rail-out area 150 could be recirculated onto the meat processing line. The rail-out area 150 or rail-out line, therefore, may simply be a single line or series of lines in parallel that may be used to store or accumulate carcasses 200 when the segment 154 of the power chain adjacent the inspection station is slowed or shut off. Carcasses are manually guided off the line and into the rail-out area 150 in one embodiment. In another embodiment, a surge capacitor is used that flows the carcasses from the first power chain segment 152 to the accumulation area 150 when the segment 154 of the power chain adjacent the inspection station is shut off. The carcasses, therefore, in one embodiment, enter the rail-out area only when the segment 154 of the power chain adjacent the inspection station is stopped. The carcasses 200 in the accumulation area 150 may then be moved from the accumulation area 150 to the segment 154 of the power chain adjacent the inspection station when that segment 154 is running.

In another embodiment, a separate or intermediate power chain is used as the accumulation area 150, as depicted in FIG. 9. This separate power chain is placed between the power chain 154 adjacent the inspection station and the power chain 152 before the accumulation area. This separate power chain is a small rail-out area in which carcasses may accumulate before entering the segment 154 of the processing line adjacent the inspection area. This separate power chain is of sufficient length to collect a significant number of carcasses and may move at a slow rate (although any rate of movement could be used).

In one embodiment of the present invention, this intermediate power chain segment is used to allow further processing of the carcasses. In this embodiment, carcasses that are tagged or identified by either FDA inspectors or the operators of the meat processing line, as "problem" carcasses, are diverted into the intermediate power chain segment for further processing. Problem carcasses include those that need some type of further processing, including trimming. Those carcasses that are not identified as problem carcasses are allowed to pass directly only the inspection segment 154. This embodiment allows that further processing to be performed without slowing the previous power chain segment.

C. Inspection and Scaling of Carcasses

As noted above and as shown in FIG. 2, in one embodiment of the invention, a carcass 200 is weighed 58 and washed 62 before the carcass 200 is inspected by the USDA for contamination or other defects. FIG. 6 depicts one embodiment of a floor plan for a meat processing line in accordance with the invention. At a portion of the line upstream from the inspection station 166, an accumulation area 150 may be placed, and a first power chain segment may be used before the accumulation area 150 and a second power chain segment may be used after the accumulation area 150. Because the line is typically stopped or slowed down when a contaminated and/or defected carcass 200 is discovered at an inspection station 166, placing the accumulation area 150 before the inspection station 166 allows the portion of the line before the accumulation area 150 to continue to run even if the portion of the line at the inspection station 166 is slowed or shut off. By placing the accumulation area 150 before the inspection station 166, which may be a government (e.g., the USDA) inspection area, therefore, the line is able to run more efficiently. As explained above, any type of accumulation area 150, such as a stack or rail-out area or separate line, may be used to create a detour or diversion for carcasses 200 before the inspection station 166.

In commercial beef production, carcasses typically move along a single chain or line at the rate of 150 to 600 head of cattle per hour, more particularly 200 to 400 head of cattle per hour, and even more particularly 250 to 350 head of cattle per hour, although this rate may vary widely. The portion of the line adjacent the inspection station 166, however, may be able to run at a faster rate than the portion of the line in which the animal is slaughtered, gutted, and split. In an embodiment of the invention containing an accumulation area 150, the difference in speed for different segments of the processing line may amount to greater efficiency for the processing line.

For example, if an inspector locates a contaminated or infected carcass 200 and slows or stops the line, the segment of the line upstream from the inspection station 166 may continue to run at a fixed rate, and the inspector may later catch up and empty the stack or accumulation area 150 by running the segment of the line at its typical speed. In one embodiment, for instance, the segment of the processing line in which the animal is slaughtered, gutted, and split may operate at about 250 head per hour. The segment of the line in which the inspection station 166 is located, however, may be capable of running at a rate of about 325 head per hour. In other embodiments, the segment of the line in which the animal is slaughtered and gutted may run at about 300 head per hour, and the segment of the line in which the inspection station 166 is located may run at about 345 head per hour. In yet another embodiment, the segment of the line in which the animal is slaughtered may run at about 250 to 350 head per hour, and the segment of the line in which the inspection station 166 is located may run at about 325 to 375 head per hour. If the stack or accumulation area 150 has a large number of carcasses 200 contained therein due to the shutting down of the inspection segment of the line, the inspection segment of the line may run at a faster rate and empty the stack or accumulation area 150, thus catching up with the slaughter segment of the line.

In one embodiment of the invention, as depicted in FIG. 2, the animal is first stunned and then bled (block 50). Next, the hide is stripped (block 52) from the carcass 200, and the carcass 200 may then be prewashed (block 54). The head, extremities, and viscera may then be removed from the carcass 200, and the carcass 200 may be gutted. The carcass 200 may then be sawed in half (block 56), thus producing two sides, with each side containing half of the vertebral column and sternum, and each side being generally symmetric with the other side. After a carcass 200 is split into two sides, each side (or carcass) may be weighed on a scale (block 58), with the weight being used in part to determine the price to be paid to the producer of the carcass 200. After the carcass 200 has been weighed, the carcass 200 may be accumulated in an accumulation area (block 60) along the meat processing line. After stacking, the carcass 200 may be washed (block 62), a process that may include a traditional cold wash and/or a steam pasteurization system and/or a steam vacuum system (shown as block 160 in FIG. 6). In some beef production processes, the carcasses 200 are subjected to electrical stimulation in an effort to tenderize the meat of the carcass 200, and such a process may be performed shortly after hide removal or carcass splitting. After washing, the carcass 200 may be trimmed (block 64) to remove fatty, dirty, or undesirable portions from the carcass 200. After washing and trimming, the carcass 200 may be inspected (block 70) at a government inspection station, and then the carcass 200 may be chilled (block 72) and in cold storage.

FIG. 6 depicts one embodiment of a floor plan for a meat processing line in accordance with the invention. The kill station and blood collection area 130 is located at the beginning of the meat processing line, followed by miscellaneous cutting stations 132 in which certain portions of the animals, such as limbs, may be removed. The hide removal stations 134 are the next stations on the meat processing line, followed by a prewash station 136. In one embodiment, the gutter stations 138 may then follow on the meat processing line, where the viscera and other portions of the carcass 200 may be removed. In one embodiment, split saw stations 140 may then be placed along the meat processing line to split the carcasses 200 into two halves in processing procedures in which carcasses 200 are split into two generally symmetric halves, as is commonly performed during beef production. The scales 142 may then follow the split saw stations 140, and the accumulation area 150, with an indexer 156 if needed, may then follow the scales 142.

In other embodiments, the accumulation area 150 is located before the scales 142, such that a first segment 122 of the power chain may end after the split saw stations 140 and a second segment 124 of the power chain may begin before the scales 142. FIG. 6, which depicts the accumulation area 150 after the scales 142 and before the washing and trimming stations 160, 162, 164, shows in a broken line segment 155 the area between two segments 122, 124 of a power chain. A first segment 122 of the power chain may be before the accumulation area 150 and the second segment 124 of the power chain 124 may be located after the accumulation area 150.

Because there may be some concern about carcass-to-carcass contact and the spreading of contamination before a carcass 200 is inspected, in one embodiment the carcass 200 is thoroughly cleaned by washing, steam pasteurization, an acid spray, or any other method known to those skilled in the art before the carcass 200 is inspected. In the floor plan of FIG. 6, steam vacuums 160 may be placed after the stack 150 to clean the carcasses 200. In one embodiment, one steam vacuum 160 may be placed on a low stand so that it may be used to clean the forequarter of each carcass 200 and a second steam vacuum 160 may be placed on a high stand in order to clean the hindquarters of the carcass 200. The steam vacuums 160 may be used to remove any contaminants from the carcass 200, and the operators of the steam vacuums 160 may observe the carcass 200 and remove it from the line if it contains unacceptable levels of contaminants. The carcass 200 may then run through a cold carcass wash 164 or some other washing station, such as a steam pasteurization or spray system, to further clean the carcass 200. In other embodiments, the steam vacuums 160 may be placed before the accumulation area 150 to clean the carcasses 200 prior to accumulation.

A thorough washing of the carcass 200 after the accumulation area 150 and before the inspection by a government inspector, such as the USDA, ensures that the carcass 200 is clean and in proper form for inspection. In one embodiment of the invention, the inspection station 166 is located near or at the end of the processing line before the carcass 200 enters the chiller 170 for chilling and aging. In such an embodiment, the carcass 200 will be inspected after all or almost all of the pre-aging processing has been done on the carcass 200, and the carcass 200 will therefore likely enter the chiller 170 without contamination if no contamination is detected during the carcass inspection at the inspection station 166.

In one embodiment of the present invention, a rail-out area 163 is used to transfer a carcass 200 to a trimming and pre-inspection area 162, if necessary. Only carcasses 200 that are identified as problem carcasses by an inspector or quality assurance person are routed to the trimming and pre-inspection area 162. In one embodiment, problem carcasses 200 are identified by the inspector or quality assurance person visually inspecting the carcass for any visible problems, including foreign matter on the carcass or discoloration of the carcass 200. In this embodiment, the carcasses 200 that are identified as problems are diverted from the main processing line to the trimming and pre-inspection area 162 using a rail-out switch, as commonly known to those of skill in the art.

If a carcass 200 is moved to the trimming and pre-inspection area 162, the carcass 200 may be trimmed, cleaned, and inspected by quality assurance personnel in order to ensure that it is in proper condition for recirculation onto the meat processing line. After the carcass 200 is trimmed and/or cleaned sufficiently, it is re-circulated onto the meat processing line. In one embodiment, less than twenty percent of the carcasses 200 are diverted to the trimming and pre-inspection area 162. The remainder of the carcasses 200 bypass the trimming and pre-inspection are 162 and continue to move along the meat processing line. This embodiment allows those carcasses 200 that need additional processing to receive that processing without slowing down the preceding power chain segment.

In one embodiment, the trimming and pre-inspection area 162 is located between two independent power chain segments. When necessary, the downstream segment is operated at a greater rate than the upstream segment to allow it to handle the additional carcasses entering from the trimming and pre-inspection area 162. This allows the upstream segment to continue to operate at the same speed.

In one embodiment, the inspection station 166 includes a scale for a final weighing of the carcasses 200. Weighing the carcasses 200 after they exit from the trimming and pre-inspection area 162 allows a weight to be obtained that reflects any portion of the carcass that is removed during final trimming.

The invention as described has a number of advantages over previous methods. First, as explained above, an accumulation area 150 placed before the inspection station may allow the meat processing line to operate more smoothly than if no such accumulation area 150 is present at that location. The processing line, therefore, may will be more efficient than if such a procedure is not used and carcasses produced on the processing line may well be microbially improved over traditional meat processing floors. Second, in an embodiment in which the carcass 200 is weighed before inspection, trimming, and other functions, the carcass 200 may well weigh a greater amount than if the carcass 200 is weighed after such procedures. This process may result in an improved carcass yield, which will benefit producers of animals who sell on a dressed weight basis. Further, data concerning weight loss may be collected because the carcasses 200 may be weighed before trimming. Third, in an embodiment in which the carcass 200 is inspected immediately or shortly before entering the chiller, the chance of high microbial growth before the carcass 200 enters the chiller is minimized. Contamination of carcasses 200, which most commonly occurs along the processing line when the carcass 200 is not chilled, may therefore be reduced. Further, the act of inspecting may have a greater meaning as one can be more confident that an inspected carcass 200 that has successfully passed through inspection is, indeed, free from contamination or other defects.

Although portions of this detailed description depict and describe embodiments of the invention dealing with beef or beef carcasses, these references to beef should not be read to limit the invention to the production of beef products.

Rather, this specification should be read as applying to any animal that is slaughtered and processed along a meat processing line, including cattle. The invention, for example, may also be applicable to all age classes of bovine, porcine, and ovine animals. In this specification, bovine animals include, but are not limited to, cattle, steers, heifers, cows, bulls, and also buffalo. Porcine animals include, but are not limited to, sows, gilts, barrows, boars, and feeder pigs. Ovine animals include, but are not limited to, sheep and lamb.

Although the present invention has been described with reference to preferred embodiments, workers skilled in the art will recognize that changes may be made in form and detail without departing from the spirit and scope of the invention.

We claim:

1. A method for processing meat, wherein a beef carcass supported by a trolley moves along a meat processing line, the method comprising:

removing viscera from the beef carcass;

providing an at least one trolley at an accumulation area along the meat processing line, wherein the accumulation area allows the beef carcass to be accumulated and separated from a remainder of the meat processing line so that the remainder of the meat processing line is unhindered by the accumulated beef carcass;

returning the at least one trolley to the meat processing line;

washing the beef carcass; and inspecting the beef carcass at an inspection station following the act of washing the beef carcass.

2. The method of claim 1 wherein the meat processing line contains a first power chain segment and a second power chain segment, and wherein the accumulation area is positioned between the first power chain segment and the second power chain segment.

3. The method of claim 2 further comprising running the first power chain segment at a slower rate than the second power chain segment.

4. The method of claim 3 wherein the accumulation area is a dead rail stack.

5. The method of claim 1 wherein the accumulation area is a rail-out section.

6. The method of claim 1 further comprising weighing the carcass before the act of inspecting.

7. The method of claim 1 further comprising weighing the carcass before the act of accumulating and after the act of removing viscera.

8. The method of claim 7 further comprising trimming unwanted portions from the carcass after the act of weighing.

9. The method of claim 1 further comprising, after the removing step, diverting at least one problem carcass to a further processing line.

10. The method of claim 9 further comprising thoroughly washing and pre-inspecting the at least one problem carcass as it travels along the further processing line and returning the at least one problem carcass to the meat processing line.

11. A method for processing a beef carcass, the method comprising:

attaching the beef carcass to a trolley and propelling the trolley along a rail of a meat processing line through the use of a power chain having a first power chain segment and a second power chain segment;

removing viscera from the beef carcass;

accumulating the beef carcass in an accumulation area along the meat processing line, wherein the accumulation area is formed generally between the first power chain segment and the second power chain segment, so that a plurality of beef carcasses may be accumulated in the accumulation area in a manner that does not hinder the movement of a further beef carcass on either of the first power chain segment or the second power chain segment;

washing the beef carcass following the act of accumulating; and inspecting the beef carcass following the act of washing the beef carcass.

12. The method of claim 11 wherein the act of accumulating comprises stacking a number of carcasses in a dead rail stack along the meat processing line.

13. The method of claim 11 wherein the act of accumulating comprises accumulating a number of carcasses in a rail-out area along the meat processing line.

14. The method of claim 11 further comprising stopping the second power chain segment while continuing to run the first power chain segment, wherein the act of stopping the second power chain segment initiates the act of accumulating.

15. The method of claim 11 wherein the second power chain segment runs at a faster rate than the first power chain segment, after the accumulating step has occurred.

16. The method of claim 15 wherein the first power chain segment runs at a rate of about 250 to 350 head per hour and the second power chain segment runs at a rate of about 325 to 375 head per hour.

17. The method of claim 11 further comprising, prior to the inspecting step, a step of trimming the carcass.

18. The method of claim 11 wherein the accumulation area is adapted to accumulate the trolley supporting the beef carcass.

* * * * *